US012810604B2

(12) United States Patent
Fischer et al.

(10) Patent No.: US 12,810,604 B2
(45) Date of Patent: Nov. 24, 2026

(54) RESOURCE MANAGEMENT FOR SATELLITE-BASED OBSERVATION

(71) Applicant: Airbus Defence and Space GmbH, Taufkirchen (DE)

(72) Inventors: Christian Fischer, Taufkirchen (DE); Lutz Petrat, Taufkirchen (DE); Roland Gierlich, Taufkirchen (DE); Francisco Ceba-Vega, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 389 days.

(21) Appl. No.: 18/540,032

(22) Filed: Dec. 14, 2023

(65) Prior Publication Data

US 2024/0203117 A1 Jun. 20, 2024

(30) Foreign Application Priority Data

Dec. 16, 2022 (DE) ......................... 102022133667.0

(51) Int. Cl.
*G06V 20/13* (2022.01)

(52) U.S. Cl.
CPC .................................... *G06V 20/13* (2022.01)

(58) Field of Classification Search
None
See application file for complete search history.

(56) References Cited

U.S. PATENT DOCUMENTS

2010/0063733 A1* 3/2010 Yunck ..................... G01S 13/90
701/469

FOREIGN PATENT DOCUMENTS

DE 102004045273 A1 * 3/2006 ......... G01S 13/9054

OTHER PUBLICATIONS

European Search Report for U.S. Appl. No. 23204,517 dated Mar. 25, 2024.

Bianchessi N. et al., "Planning and scheduling algorithms for the COSMO-SkyMed constellation," Aerospace Science and Technology, Elsevier Masson, Masson, Oct. 1, 2008.

De Florio Sergio et al., "Optimal Operations Planning for SAR Satellite Constellations in Low Earth Orbit," 6th International Symposium on Reducing The Costs of Spacecraft Ground Systems and Operations, Jun. 17, 2005.

Hongrae Kim et al., "Mission scheduling optimization of SAR satellite constellation for minimizing system response time," Aerospace Science and Technology Jan. 1, 2015.

Hongrae Kim et al, "Optimal mission scheduling for hybrid synthetic aperture radar satellite constellation based on weighting factors," Aerospace Science and Tecnhonlogy, Elsevier Masson , Oct. 20, 2020.

(Continued)

*Primary Examiner* — Whitney Moore
(74) *Attorney, Agent, or Firm* — KDW Firm PLLC

(57) ABSTRACT

An observation system for observing a region of interest. The observation system has multiple mobile sensor carrier platforms and a resource allocation unit. The mobile sensor carrier platforms may be configured as satellites having a sensor signal emitter and/or a sensor signal receiver, for example. The resource allocation unit is configured to assign tasks to the sensor carrier platforms on the basis of various criteria in order to improve the efficiency for carrying out the tasks and the completion rate.

20 Claims, 3 Drawing Sheets

(56) References Cited

OTHER PUBLICATIONS

D'Errico M. et al., "The Bissat Mission: a Bistatic SAR operating in formation with COSMO/SkyMed X-band Radar," Aerospace Conference Proceedings, Mar. 9-16, 2002.

Rodriguez-Cassola, M. et al., "Bistatic TerraSAR-X/F-SAR Spaceborne-Airborne SAR Experiment: Description, Data Processing, and Results," IEEE Transactions on Geoscience and Remote Sensing, Feb. 1, 2010.

* cited by examiner

RESOURCE MANAGEMENT FOR SATELLITE-BASED OBSERVATION

TECHNICAL FIELD

The present description relates to an observation system for observing a region of interest. In particular, the description relates to an observation system that facilitates satellite-based observation and monitoring and is distinguished by automated resource allocation, which has some advantages over manual resource allocation.

BACKGROUND

To obtain information about a region of interest, a multiplicity of technical devices can be employed to observe the region of interest with sensors that acquire information in various spectral ranges of the electromagnetic spectrum. In principle, sensors may be installed on ground-based, sea-based or air-based platforms and can observe the surroundings. Each of these approaches is distinguished by specific properties.

Ground-based sensors may be stationary and permanently installed or else mobile. Aircraft-based systems are mobile by nature. In addition, sensors can be installed on satellites. This allows wide and flexible coverage to be attained for observing Earth's surface and the airspace.

Observation from the air or from an Earth orbit has the advantage that even difficult-to-access areas of Earth's surface (this relates both to land and water) or the air situation can be picked up with little complexity. From time to time, this approach allows a high level of accuracy for the observation and affords the advantage that the sensors as such are comparatively difficult to detect.

If satellites in low or medium Earth orbit (LEO: low Earth orbit; MEO: medium earth orbit) are used as a sensor carrier platform, they are typically constantly in motion, which means that the sensor carrier platform and also the respective sensors are continuously changing their relative position in relation to the region of interest to be observed.

Satellite-based radar systems involve radar signals being transmitted by a satellite, for example. The signals reflected by objects to be reconnoitred are received by satellite-based receivers, aircraft-based receivers and/or ground-based receivers.

SUMMARY

The object can be considered that of improving resource allocation in a satellite-based observation system, in particular compared with manual allocation, which needs to be continually updated. This object arises in particular in the case of simultaneous observation of multiple regions of interest with attendant conflicts for the resource allocation.

This object is achieved by the subject matter and description that follows.

According to one aspect, an observation system for observing a region of interest is specified. The observation system has a plurality of mobile sensor carrier platforms and a resource allocation unit. A first group of sensor carrier platforms from the plurality of mobile sensor carrier platforms contains a sensor arrangement having a sensor signal emitter and a second group of sensor carrier platforms from the plurality of mobile sensor carrier platforms contains a sensor arrangement having a sensor signal receiver. The observation system is designed to have the plurality of mobile sensor carrier platforms operated in at least one of three modes of operation at a predetermined instant. Each mobile sensor carrier platform is designed to statically observe the region of interest in a first mode of operation, to dynamically move the region of interest in a second mode of operation, according to at least one object to be observed, and to emit sensor signals into the region of interest in a third mode of operation, the reflections of the sensor signals being able to be received by at least one receiver that is spatially separate from the plurality of mobile sensor carrier platforms. The resource allocation unit is designed to assign at least one mobile sensor carrier platform to a task linked to one of the three modes of operation, on the basis of one or more of the following criteria: relative position between the mobile sensor carrier platform and the region of interest, direction of movement of the sensor carrier platform, direction of movement of an object to be observed in the region of interest, number of sensor carrier platforms with line of sight to the region of interest, attitude of the sensor carrier platform, alignment of the sensor signal emitter and the sensor signal receiver, available resources of the sensor carrier platform for observation tasks, priority of the observation task.

In principle, the mobile sensor carrier platforms may be positioned on Earth's surface, in the air or in an orbit around Earth outside Earth's atmosphere and can follow a predetermined path of movement.

One sensor carrier platform may be designed just to emit sensor signals. Another sensor carrier platform may be designed just to receive sensor signals. It is also conceivable for a sensor carrier platform to contain functional modules both for emitting and for receiving signals and accordingly to be able to perform both functions. The plurality of mobile sensor carrier platforms is designed such that the individual sensor carrier platforms can be assigned to two groups according to their function: sensor carrier platforms that contain a sensor signal emitter are members of the first group, and sensor carrier platforms that contain a sensor signal receiver are members of the second group. It is conceivable and possible for a sensor carrier platform to be a member in both the first group and the second group. Some sensor carrier platforms may also be a member in only a single group, however.

The first group contains at least one sensor carrier platform having a sensor signal emitter, but preferably at least two or more such sensor carrier platforms. The second group contains at least one sensor carrier platform having a sensor signal receiver, but preferably at least two or more such sensor carrier platforms.

In other words, this means that a specific sensor carrier platform contains either (1) only a sensor signal emitter or (2) only a sensor signal receiver, or (3) both a sensor signal emitter and a sensor signal receiver. By way of example, a first sensor carrier platform contains a sensor signal emitter that emits a signal, and a second sensor carrier platform (and/or the first sensor carrier platform) contains a sensor signal receiver that receives a reflected signal.

A sensor arrangement is understood in the present case to mean at least some of the components of a sensor carrier platform that are provided for an observation process. These components are in particular one or more transmitters that deliver an electromagnetic signal (referred to as sensor signal emitters in the present case) and/or one or more sensor signal receivers that receive an electromagnetic signal (referred to as sensor signal receivers in the present case).

The observation system having the plurality of sensor carrier platforms and the associated respective sensor arrangements is designed to implement functions of a radar, for example. In this case, the sensor signal emitter transmits a signal that is reflected by objects. The reflected signals are received by receivers in order to draw conclusions about the type and/or movement of this object therefrom. The way in which such a radar system works is sufficiently well known in this respect. The reflected signals can be received by the sensor signal receiver of that mobile sensor carrier platform whose sensor signal emitter transmitted the initial signal. Alternatively or additionally, the reflected signals can also be received and evaluated by a sensor signal receiver of another mobile sensor carrier platform or another receiver.

The mobile sensor carrier platform can have its sensor signal emitter operated in one mode of operation and/or can have the sensor signal receiver operated in one or two modes of operation at a specific instant. By way of example, this means that the sensor signal emitter can emit signals having different frequencies and/or signals in different directions at different instants. The mode of operation in which the sensor carrier platform is to be operated is predetermined by the task to be performed. As such, for example the resource allocation unit can selectively stipulate the mode of operation or the modes of operation in which each of the mobile sensor carrier platforms is operated.

In the first mode of operation, a comparatively large freely predefinable region of interest is observed, or monitored. By way of example, the region of interest is predetermined by its coordinates and/or spatial extent and is observed by one or more suitable sensor carrier platforms according to a specific scheme. In the first mode of operation, the boundaries of the region of interest typically remain the same throughout the task and do not move, that is to say that the region of interest is statically observed over the entire duration of the task. The boundaries of the region of interest can also be altered, however. The first mode of operation thus places the region of interest as such at the focus of the observation.

In the second mode of operation, a comparatively small region of interest (that is to say distinctly smaller than the region of interest that is observed in the first mode of operation) is observed. This small region of interest can be observed with a higher repetition rate, resolution or accuracy. Similarly, there is provision in the second mode of operation for a detected object in the region of interest to be tracked, which can also be referred to as dynamic observation. For this purpose, the sensor carrier platform and/or the sensor signal emitter and/or the sensor signal receiver can be aligned as required, for example in order to follow the movement of the observed object and/or to compensate for the movement of the sensor carrier platform relative to the observed object.

In the third mode of operation, the sensor carrier platform transmits a radar signal. This radar signal is reflected by observed objects and can then be received by receivers that are in spatial proximity to the observed object. This mode of operation can also be referred to as an assistive mode of operation because, in this mode of operation, the observation and tracking of the observed object is facilitated and assisted by receivers that themselves do not have to transmit a radar signal. By way of example, the receivers may be aircraft or ground stations. Since these receivers for their part do not have to emit radar signals, they are themselves better protected against reconnaissance, because the receivers play only a passive part in the reconnaissance.

The resource allocation unit is designed to make an assignment between a task and one or more sensor carrier platforms. By way of example, the task may be an observation task that is performed in the first or second mode of operation. It may alternatively be an assistance task that is performed in the third mode of operation.

The resource allocation unit assigns for example multiple sensor carrier platforms to a task, in particular such that at least three bistatic signal paths arise for an observation task.

To usefully make the assignment between the task and the sensor carrier platforms, at least one criterion or multiple criteria from a series of criteria is/are taken into consideration. The relative position of the mobile sensor carrier platform in relation to the region of interest in which the task needs to be performed indicates whether a sensor carrier platform has a line of sight to the region of interest, and/or whether the line of sight exists to the entire region of interest, and/or for what period of time this line of sight exists. This information is important particularly in the case of mobile sensor carrier platforms that follow a predetermined movement. The direction of movement of the sensor carrier platform indicates how the relative position of the sensor carrier platform in relation to the region of interest changes. As such, it is advantageous if a sensor carrier platform moves toward the region of interest rather than away from it, because then the period of time in which the line of sight exists between the sensor carrier platform and the region of interest is longer than if the sensor carrier platform has already largely passed the region of interest. Nevertheless, a sensor carrier platform can also be involved in a task if it is able to perform this task only for a short time. Such an assignment has the advantage that other sensor carrier platforms are relieved of load. Similarly, the direction of movement of an object to be observed can be taken into consideration. It may be advantageous if this direction of movement at least partially coincides with the direction of movement of a sensor carrier platform. Furthermore, the number of sensor carrier platforms with line of sight to the region of interest can be taken into consideration. By way of example, a task can be assigned to a sensor carrier platform if only a specific single sensor carrier platform is suitable for this task. This is the case if only one sensor carrier platform has a line of sight to the region of interest for this task. Furthermore, the attitude of the sensor carrier platform can be taken into consideration, the attitude specifying the spatial orientation of the sensor carrier platform. This criterion indicates whether a sensor carrier platform still needs to be aligned with the region of interest before the task is performed so that the sensor signal emitter and the sensor signal receiver are suitably adjusted. Besides the attitude of the sensor carrier platform, the relative alignment of the sensor signal emitter and the sensor signal receiver in a sensor carrier platform can also be taken into consideration. It may be less complex to align the sensor signal emitter and/or the sensor signal receiver in the sensor carrier platform than the sensor carrier platform as a whole. Furthermore, for this assignment of the task to a sensor carrier platform, it is also possible to take into consideration what free resources a sensor carrier platform has and the priority of the task.

This approach facilitates flexible operation of an observation system and the processing of tasks in an extremely variable scenario that contains a large number of user requests, which can also change very dynamically. The tasks are therefore assigned dynamically and the system is distinguished by a high completion rate.

According to one embodiment, the resource allocation unit is designed to ascertain the total number of sensor carrier platforms with a line of sight to the region of interest of the task, wherein the resource allocation unit is designed so as, given multiple tasks, to initially make an assignment according to availability, which involves initially assigning a sensor carrier platform to that task that has the lowest number of sensor carrier platforms with line of sight to the relevant region of interest.

By way of example, this information can be used to determine the total number of suitable sensor carrier platforms in principle for each task. By way of example, an assignment can then initially be made between a task and the sensor carrier platforms if only one sensor carrier platform is suitable for a task. Other tasks that can be attended to by multiple sensor carrier platforms can then still be assigned to other sensor carrier platforms.

In the mode of assignment according to availability, the tasks can be sorted in such a way that the tasks are organized in a list in ascending order according to the number of sensor carrier platforms suitable for the respective task. The assignment between tasks and sensor carrier platform(s) can then be made according to the order of this list, wherein, in a preferred variant, a sensor carrier platform remains in the list for subsequent tasks for as long as this sensor carrier platform has further available resources for additional tasks.

According to another embodiment, the resource allocation unit is designed to follow the assignment according to availability by making an assignment according to priority for the tasks, which involves initially assigning tasks with higher priority to sensor carrier platforms.

The first step thus involves initially attending to those tasks that can be performed exclusively by single sensor carrier platforms. The sensor carrier platforms that can support multiple tasks are then distributed according to the priority of the tasks.

The tasks can be sorted according to priority in a list, the tasks with higher priority coming earlier. The tasks are then assigned to the sensor platforms according to their order in the list sorted according to priority.

According to another embodiment, further tasks are assigned to sensor carrier platforms according to priority in descending order.

According to another embodiment, the resource allocation unit is designed to reassign a task to a mobile sensor carrier platform at regular or irregular intervals of time.

Particularly in the case of mobile sensor carrier platforms and in the case of variable user requests (which are referred to as a task in the observation system) and also possibly in the case of moving objects to be tracked, it is useful to reassign tasks to sensor platforms after certain times. The intervals of time addressed here may be previously stipulated intervals of time. However, this does not necessarily mean that the task is then immediately reassigned. Rather, the task may remain with the current sensor carrier platform if no other sensor carrier platform is in a better suited position.

According to another embodiment, the resource allocation unit is designed to reassign a task to a mobile sensor carrier platform if the resource allocation unit receives a further task.

In principle, if a new user request is sent to the resource allocation unit, this user request can be assigned as a task to the sensor carrier platforms that still have sufficient resources. Alternatively, however, the entire process of assigning tasks to sensor carrier platforms can also be carried out again. By way of example, the new task may have a priority that is higher than the tasks already assigned. The new task therefore receives priority treatment for the next assignment. The priority of a task is normally predetermined by a user of the observation system.

According to another embodiment, the resource allocation unit is designed to produce a command for adapting the attitude of a sensor carrier platform and to transmit this command to the sensor carrier platform.

This command is used to put the sensor carrier platform into a spatial orientation in which it is able to complete a task. To adapt the attitude, the sensor carrier platform resorts to a drive unit.

According to another embodiment, the resource allocation unit is designed to produce a command for adapting the alignment of the sensor signal emitter and/or the sensor signal receiver and to transmit this command to a sensor carrier platform.

This command is used to adapt the direction of transmission of a sensor signal emitter and/or the direction of reception of a sensor signal receiver. This adaptation can be carried out mechanically and/or electronically. The sensor signal emitter and/or the sensor signal receiver may each be movably mounted on the sensor carrier platform using a suspension. This suspension can be moved by actuators, for example, in order to align the sensor signal emitter and/or the sensor signal receiver. This alignment can also be carried out electronically, however, by adapting the direction of transmission and/or the direction of reception of an antenna that is used as sensor signal emitter or as sensor signal receiver.

According to another embodiment, the plurality of mobile sensor carrier platforms is a plurality of satellites in an Earth orbit.

The sensor carrier platforms are preferably designed as satellites and move in an Earth orbit. The multiple satellites can revolve around Earth in a so-called satellite constellation in one or more orbital planes.

According to another embodiment, the region of interest is observed in the first mode of operation and/or the second mode of operation by virtue of a first sensor carrier platform emitting a signal and the first sensor carrier platform and/or at least one other sensor carrier platform receiving the signals reflected by an observed object.

According to another embodiment, a sensor carrier platform is designed to observe the region of interest in the first mode of operation and/or the second mode of operation on the basis of a timestamp of acquired data, with the result that the sensor signal emitter emits radar signals into an area in the region of interest whose observation data have the oldest timestamp in the region of interest.

It is not normally possible to observe the entire region of interest simultaneously. Rather, the sensor signal emitter and/or a sensor signal receiver need to be aligned with one area in the region of interest on account of physical circumstances (antenna lobe, observation angle, and other properties of the antennas used as the sensor signal emitter and the sensor signal receiver). Multiple observation data are therefore acquired at successive times. The respective observation data can be provided with a timestamp. The sensor signal emitter can be actuated in such a way that it is aligned with the area in the region of interest whose observation data have the oldest timestamp.

According to another embodiment, the region of interest is observed in the third mode of operation by virtue of a sensor carrier platform emitting a signal and the receiver being arranged aboard an aircraft that is in the air and receiving the signals reflected by an observed object.

In this mode of operation, an aircraft can track the object to be observed without the aircraft needing to emit radar signals of its own. The radar signals are emitted by the satellites, then reflected by the observed object, to then be received and evaluated by the aircraft. This has the advantage that this aircraft is better camouflaged against electromagnetic reconnaissance measures because the aircraft merely receives reflected radar signals, but does not transmit them.

According to another embodiment, the resource allocation unit is arranged spatially separately from the plurality of mobile sensor carrier platforms. Alternatively, the resource allocation unit is structurally associated with a mobile sensor carrier platform.

The resource allocation unit may be arranged in a ground station, for example. The resource allocation unit has a data connection to multiple mobile sensor carrier platforms. This data connection is a wireless connection that can normally be used to transmit data bidirectionally. The resource allocation unit can therefore transmit data to the sensor carrier platforms and receive data from the sensor carrier platforms.

Besides the data connection between the resource allocation unit and the sensor carrier platforms, there may also be data connections between the individual sensor carrier platforms.

However, it is also conceivable for the resource allocation unit to be arranged aboard a sensor carrier platform (for example on a satellite).

The resource allocation unit manages the assignment of tasks to sensor carrier platforms and therefore the use of the sensor arrangements of those sensor carrier platforms to which the resource allocation unit has a data connection. In one satellite constellation, it is conceivable for multiple resource allocation units to be used that are spatially separate from one another but nevertheless connected to one another. It is therefore possible to ensure that for each satellite in the satellite constellation there is a data connection to a resource allocation unit, irrespective of where the respective satellite is located relative to Earth.

The observation system described here and the associated resource allocation unit facilitate observation of regions of interest with high accuracy and irrespective of local information sources, and also a reduced risk for local sensor carriers. The resource allocation unit allows the observation system to be operated flexibly to meet changing user requests.

BRIEF DESCRIPTION OF THE DRAWINGS

Some details are described in more detail below with reference to the accompanying drawings. The representations are schematic and not to scale. Identical reference signs refer to identical or similar elements. In the drawings.

DETAILED DESCRIPTION

Figure 1:
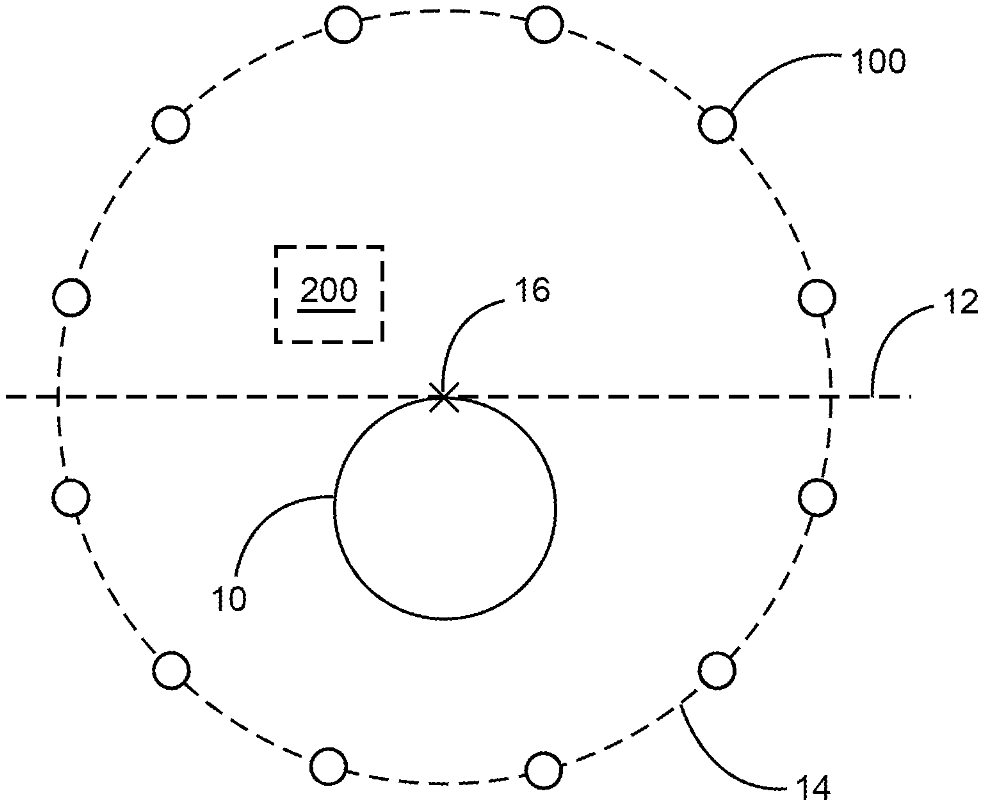
FIG. 1 shows a schematic representation of a satellite in an Earth orbit.

FIG. 1 shows a satellite 100, which is equipped as a sensor carrier platform, in an orbit 14 and Earth 10. The same orbit may contain multiple satellites, which revolve around Earth in the same orbital plane. Depending on the position of a satellite in the orbit 14, different areas of Earth's surface can be seen.

The satellite 100 has line of sight to a point or area 16 on Earth's surface or in the atmosphere above Earth's surface if a straight line can be drawn from the satellite 100 to the area 16. If line of sight exists to the area 16, a satellite can observe the area 16. Generally, line of sight exists between a satellite and an area 16 on Earth's surface if the satellite is above the horizon line 12.

A satellite constellation contains a plurality of satellites that revolve around Earth in different orbital planes. Each orbital plane contains multiple satellites normally at the same relative distance from one another. It is therefore possible for almost every area on Earth's surface to be observed by at least one satellite almost at every instant.

As is not difficult to see from the schematic representation in FIG. 1, not every satellite is suitable for every observation task at every instant. Rather, at least the sight line criterion needs to be satisfied.

A resource allocation unit 200 is shown in FIG. 1. The resource allocation unit 200 is in data communication with some or multiple satellites in order to transmit and assign tasks to the satellites. The resource allocation unit 200 takes into consideration the parameters cited earlier on for this assignment.

Figure 2:
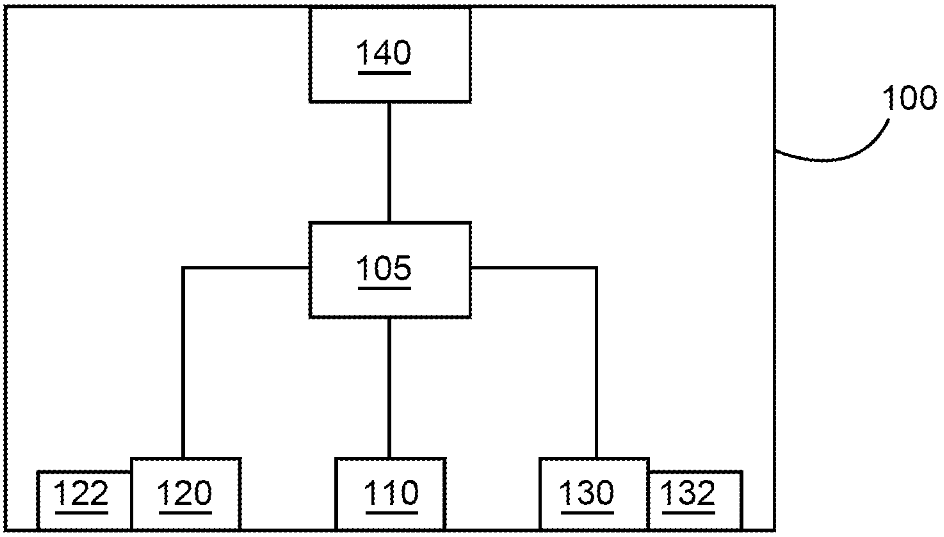
FIG. 2 shows a schematic representation of a satellite.

FIG. 2 schematically shows the design of a satellite 100 with its relevant functional units. The satellite 100 contains a control unit 105, a data transmission interface 110, a sensor signal emitter 120, a sensor signal receiver 130 and a propulsion unit 140.

The data transmission interface 110 is designed to transmit data to other satellites and/or the resource allocation unit, or to receive data. The data transmission interface is designed in particular for wireless communication, for example using optical signals or radiofrequency signals.

The sensor signal emitter 120 is designed to emit radar signals in order to detect objects in the observed region of interest. By way of example, the sensor signal emitter 120 is an antenna or an antenna array, and can be controlled electronically. The sensor signal emitter 120 may be movably mounted in or on the satellite 100 using a suspension 122 in order to adapt the radiating direction and/or radiation characteristic of the sensor signal emitter 120, or may align itself with the entire satellite as a result of fixed suspension. By way of example, the suspension 122 can move the sensor signal emitter about at least one axis, preferably about two or three axes that are perpendicular to one another, in order to steer the sensor signal emitter in a desired direction.

The sensor signal receiver 130 is the counterpart of the sensor signal emitter 120. The sensor signal receiver 130 receives signals that the sensor signal emitter has emitted and that have been reflected by an object in the region of interest. The sensor signal receiver thus receives the reflected radar signals in order to take them as a basis for tracking an object and the movement thereof in the region of interest. Like the sensor signal emitter 120, the sensor signal receiver 130 may be movably mounted in or on the satellite 100 using a suspension 132, or may align itself with the entire satellite as a result of fixed suspension.

The sensor signal emitter 120 and the sensor signal receiver 130 may be arranged in or on the satellite 100 structurally separately from one another. In this case, the sensor signal emitter and the sensor signal receiver can be moved and pointed at a region of interest independently of one another. However, it is also conceivable for the sensor signal emitter 120 and the sensor signal receiver 130 to be movably arranged in or on the satellite 100 by way of a single suspension. In this case, the sensor signal emitter and the sensor signal receiver are always aligned in the same direction.

By way of example, the suspension 122, 132 may be a cardanic suspension provided with one or more drives in order to produce the desired movement.

A propulsion unit 140 is arranged in order to produce a necessary or desired movement for the satellite 100. The propulsion unit 140 can be used to align the satellite 100 in a desired direction.

A control unit 105 is arranged and designed to configure and actuate the functional units of the satellite 100. By way of example, the control unit 105 ascertains or receives a control command for the propulsion unit 140 via the data transmission interface 110. The control unit 105 then passes the necessary commands to the propulsion unit 140 so that an appropriate drive force is produced. Similarly, the control unit 105 can intercept control commands for aligning the sensor signal emitter 120 and the sensor signal receiver 130 or can determine the control commands on the basis of an observation task and can actuate the suspensions 122, 132 as appropriate. Depending on the relative position and/or alignment of a satellite in relation to the region of interest to be observed, it may be necessary not only to align the sensor signal emitter and/or the sensor signal receiver but also to alter the alignment of the satellite as a whole. Accordingly, the control unit then produces the necessary control commands on the basis of the assigned task.

Figure 3:
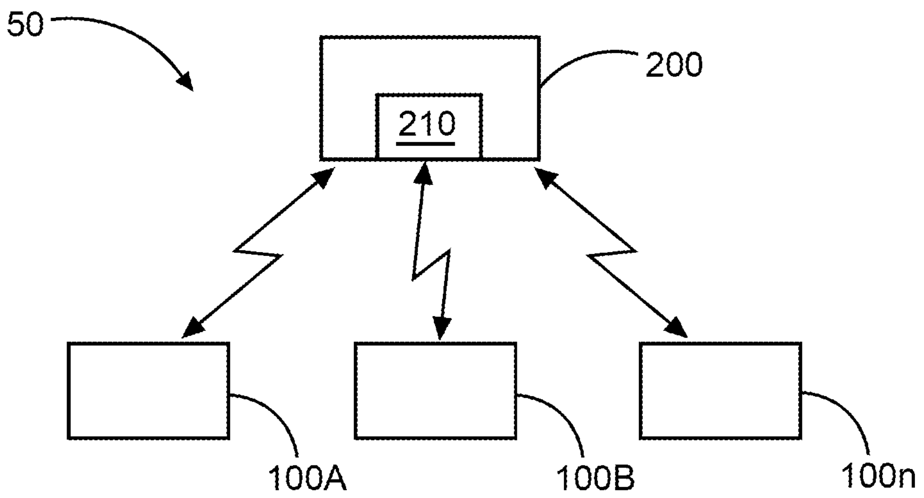
FIG. 3 shows a schematic representation of an observation system.

FIG. 3 shows a schematic representation of an observation system 50. The observation system 50 contains multiple satellites 100A, 100B, . . . , 100*n* and a resource allocation unit 200. The number of satellites in the observation system 50 is not limited to a specific number, but rather multiple satellites in one or more orbital planes of a satellite constellation may be part of the observation system 50. Similarly, two or more resource allocation units 200 can be used to assign tasks to multiple satellites. In this case, the two or more resource allocation units may be connected to one another via a mobile radio network or a line-based network in order to be synchronized with one another and/or to assign the tasks to all of the satellites in a coordinated manner.

The resource allocation unit 200 has a data transmission interface 210. The data transmission interface 210 is designed to set up a data connection to the data transmission interface 110 of each individual satellite 100, with the result that data can be interchanged between the resource allocation unit and each individual satellite.

Each satellite 100, which can also be referred to generally as a sensor carrier platform, can be operated in at least one of three modes of operation, specifically the aforementioned modes of operation. These modes of operation can be freely selected on the basis of a task for the satellite. It is also possible for two modes of operation to be carried out in parallel, however, by virtue of the control unit of a satellite actuating the sensor signal receiver as appropriate.

The observation system 50 is designed to react flexibly to the requests of users. Almost any combinations of different observation modes (modes of operation) need to be produced in parallel from time to time. Surface areas and geometries of the region of interest in the first mode of operation may be freely selectable in order to provide maximum flexibility. The satellites that are in a satellite constellation (which can be referred to as transmit and receive satellites) are optimally employed with regard to different modes of operation and assigned to tasks by the resource allocation unit in accordance with the user requests. This assignment is made dynamically, for example, which means that each new user request also results in a different sensor combination being selected for carrying out the different modes of operation—possibly with a different prioritization than before the new request.

This technical challenge is met by applying a specific resource management in particular for the sensor signal emitters and sensor signal receivers. This sensor management can be performed using the resource allocation unit either on the ground or in dedicated satellites, which may be a part of the constellation and, as so-called processing nodes, may also carry out data processing steps. These processing node satellites or the ground stations that undertake management of the individual sensors should have direct contact, e.g. via optical links, with the satellites that need to be coordinated, in order to undertake the assigned tasks in a specific region.

The modes of operation can be activated either simultaneously or in succession, specifically depending on the current situational requirements of the users. Priorities can be assigned to the modes of operation and/or the requests. In addition, the position of the satellites in the orbit with respect to the region of interest and also the flight attitude are taken into consideration for ascertaining the suitability of all satellites to support the different modes of operation, followed by assignment of the satellites to the different tasks.

In the first mode of operation, objects to be tracked in a large area are detected. This involves using exclusively sensors of satellites, specifically the sensor signal emitter and the sensor signal receiver of the same satellite or of different satellites.

In the second mode of operation, a specific object to be tracked or a group of objects is tracked. A higher update frequency can be used for this tracking than in the first mode of operation. Exclusively sensors of satellites are used in the second mode of operation too.

The information acquired in the first and second modes of operation can be transmitted to a ground station or any receiver via a data connection. The receiver may be arranged outside the sensor carrier platform or may be part or a functional module of the sensor carrier platform that has acquired the information. In the latter case, the sensor carrier platform thus contains processing capacities, and performs the function of an aforementioned processing node. All data received by this processing node can then be collectively evaluated in order to ascertain the position of one or more objects to be tracked. The sensor carrier platform that contains the processing node can also contain the resource allocation unit.

In the third mode of operation, a satellite or multiple satellites provide/s a radar signal, the reflections of which from objects to be tracked are acquired and evaluated by other aircraft in order to draw conclusions about the position of the objects to be tracked.

Figure 4:
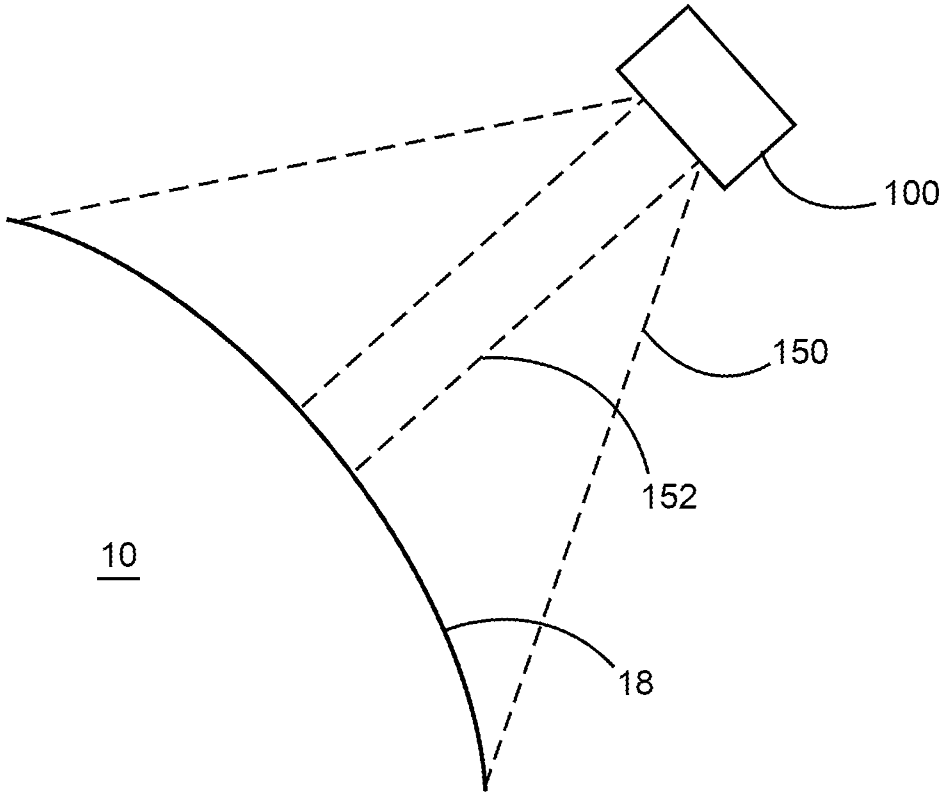
FIG. 4 shows a schematic representation of a satellite in an Earth orbit.

FIG. 4 shows a satellite 100 with reference to Earth 10. Areas 150, 152 of different size can be observed with reference to Earth's surface 18. The first area 150 is larger than the second area 152. The first area 150 is that area to which the satellite 100 can have a line of sight and that the satellite 100 can observe according to the attitude control of the satellite. From time to time, the second area 152 is distinctly smaller than the first area 150 and can be observed by adjusting the sensor signal emitter and the sensor signal receiver.

User requests are converted into tasks in the observation system 50. This conversion process can be carried out by the resource allocation unit, for example. A task contains all the necessary information to attain the desired operational response of the observation system. In particular, a task contains the following information: coordinates and extent of the region of interest and also mode of operation in which the region of interest is intended to be observed. In addition to the aforementioned characterizing features of a mode of operation, other demands may also be made on the observation system, such as for example: the operational demands on the system (response: e.g. sequential coverage of large regions or target tracking, activation time $t_{Ak}$: permissible delay for providing a resource for the task, availability period tv: minimum period for which the resources must be available after the activation time (e.g. has the effect of a restriction if a satellite will shortly reach the horizon)), the performance requirements to be met, e.g. position resolution, status of the task: "active" or "inactive". This permits predefined start and end times to be taken as a basis for not beginning the task at the next possible instant, but rather performing it at a planned time and possibly repeatedly, e.g. in the case of routine tasks, priority, for resource allocation in the event of conflicts, and optionally the quantity of resources needed.

The system supports the simultaneous performance of different tasks and is therefore capable of monitoring large regions for flight movements and at the same time tracking single targets or target groups (e.g. pairs of fighter planes) with high accuracy and at a high update rate within the large region (Track While Scan). For this purpose, the system permits resources (satellites or sensor time) to be allocated flexibly to different tasks. The allocation can be made automatically, on the basis of a rating of the suitability of all satellites for the respective tasks, and/or on the basis of the priorities of the respective tasks.

An illustrative method for allocating resources that is able to be implemented by the resource allocation unit may be designed as follows: the assignment of the satellites to the tasks is determined for a given instant and renewed at suitable intervals of time in order to take account of the changes in the satellite positions relative to the region of interest, or in the visibility. Furthermore, the assignment can be renewed at any time in the event of changes to the task profile, or to the priorities. Flexible transitions between different groups of tasks and modes of operation are therefore possible.

By way of example, all satellites are reassigned at the beginning, when the priorities of tasks change or when active tasks are added. The assignments are updated for example provided that previously active tasks have ended, or become inactive.

All currently available satellites (not in maintenance mode or the like) are determined for the reassignment. Next, a test of suitability for all active tasks is carried out for each available satellite on the basis of the following conditions: the region of interest is within the horizon (visibility) of the satellite; the angle of incidence η with respect to the reference coordinate of the region of interest (angle between the vertical and the direction of the satellite) is within a predetermined range $\eta_{min}$, $\eta_{max}$ (e.g. 0.80 degrees), the satellite can contribute to the task within the maximum activation time (includes satellites that are currently already contributing to this task), the satellite complies with the minimum availability period in accordance with the orbit prediction.

Satellites for which the suitability test has yielded only one task are assigned to the respective task. Satellites that would be suitable for multiple tasks are assigned to the associated possible tasks by way of conflict resolution using an iterative scheme, as follows:

Initially, all tasks still need to be attended to, expressed by way of binary values $b_k$=1.

1. A resource component is determined for all tasks $$r_k = (P_k b_k) / \sum_k (P_k b_k)$$

2. From the number $M_k$ of resources suitable for the current task k, the current task is allocated the first $N_k$, where $$N_k = \text{Min}\,(\text{round}\,(r_k M_k);\ \Delta L_k)$$

where $\Delta L_k$ specifies the number of resources still needed before the maximum number for the respective task is reached. Note: for tasks without a maximum number, it holds that $\Delta L_k=\infty$)

3. The task currently being processed is not considered further, i.e. $b_k$=0

4. The scheme is continued at 1. with the next task until all tasks with conflicts have been processed.

Example: 9 satellites are intended to be assigned that would be suitable for 3 tasks, $P_1$=1; $P_2$=0.5; $P_2$=0.3, no upper limit being stipulated in each case:

Task 1 is assigned Min(round(9·1/1.8); ∞)=5 satellites, i.e. there are still 4 satellites available.

Task 2 is assigned Min(round(4·0.5/0.8); ∞)=3 satellites, i.e. there is still 1 satellite available.

Task 3 is assigned the remaining satellite.

For the purpose of updating the assignments, (1.) satellites that continue to satisfy the respective conditions remain assigned to their previous tasks (minimizing the necessary manuevers or periods of inactivity), (2.) satellites that have not been assigned hitherto, or that are no longer suitable for the previous task, are retested in respect of suitability for the active tasks, and (3.) conflict resolution as described in the case of reassignment may be performed for the satellites that come under 2.

For a satellite to access a region of interest, it is necessary to align the antenna according to the coordinates of the region of interest and according to the orbital position of the satellite, this being able to be carried out mechanically and/or electronically in principle. In this context, it is assumed that the satellites have mechanical agility to allow pre-alignment with the specific assigned region of interest. The attitude control of the satellite maintains the alignment with the "reference point" despite the relative movement of the satellite, and the satellites' having electronic agility with respect to the radar sensors/antennas, to allow rapid fine alignment within the region of interest. The electronic actuation takes place according to the rules described in the sections that follow.

This combined approach limits the required electronically accessible swivel range of the antenna to a technically manageable degree, provides the high agility only where it is needed, restricts it to the region of interest, and nevertheless facilitates global coverage, as shown in FIG. 4 using the areas 150, 152.

The activation time is determined from the performance data of the attitude control (angular acceleration, angular rate), the present orientation of the satellite and the orientation required for the respective task (region of interest).

The availability period is obtained on the basis of the test of future orbital positions with regard to the above conditions, minus the activation time.

The modes of operation of the satellites are explained in more detail with reference to FIG. 5.

By way of example, the observation generally targets a region of interest that, due to its size, cannot be covered using the available resources at every location at every instant. It is therefore necessary to move the antenna lobes of the sensor signal emitters over the region of interest 20 in accordance with a passage of time. The chosen method here is intended to ensure that every location in the region of interest is covered anew after as short an update time as possible.

The region of interest is scanned progressively by advancing the antenna lobes. A specific location is illuminated in each case by one or more transmitters (Tx-Multi-Beam On Target). The transmitting antenna patterns can optionally be expanded by way of beam shaping, e.g. to increase the size of the footprints for steep angles of incidence. To facilitate multilateration, detection must be successful in at least three transmission paths simultaneously. In order for this to occur with sufficient probability, digital beamforming is provided for the receiving satellites using multiple antenna lobes simultaneously. This allows every receiving satellite to receive signals from all illuminated locations in the region of interest simultaneously. Optionally, the size of the antenna lobe in the direction of reception can additionally be increased by way of digital beamforming, e.g. by generating additional antenna lobes.

The directions of the antenna lobes of the transmitters are determined at every instant using an optimization method that takes into consideration the shape of the respective antenna main lobe on the ground. The alignment of the receiving antennas follows the alignment of the transmitting antennas. The region of interest is initially divided into a grid. The current coverage of the antenna main lobes in this grid is ascertained as a binary result (grid point "covered" or "not covered").

The lines of vision are optimized using a map of the information age of the region of interest. That is to say that for each grid point 21 (some of which are shown in the region 20 by way of illustration) in the region of interest 20 the time at which the point was picked up is stored. If the grid point is picked up at the present time, the information age is zero (seconds), whereas for example a point that was most recently picked up by an antenna lobe N seconds ago is assigned the information age N. Therefore, all grid points initially have an applicable age gain applied at all times in accordance with the difference from the previous time step, whereas at the end of the optimization in this step the points that are currently picked up are assigned the information age zero.

The optimization is carried out by a global minimum search, e.g. particle swarm, using a cost function. So that the parameter space does not become too large for the optimization, it is optionally possible to preselect N (e.g. 250) grid points with the greatest information age.

If two or more transmitters are each intended to pick up a location simultaneously (Tx-Multi-Beam On Target), groups of transmitting satellites are formed in accordance with the desired number of simultaneous antenna lobes. The selection for this is made on the basis of the greatest possible similarity of the shape of the antenna lobes. The test for similarity between two specific antenna lobes, represented in binary form in the grid, is carried out e.g. by way of logic XOR comparison. Logic ORing produces a combined antenna lobe for the group. The further optimization is then carried out on the basis of the combined antenna lobes.

The new positions of the antenna lobes are obtained as an optimization by way of the cost function, which represents a weighting for the following aspects: (1) information age: the antenna lobes are intended to be aligned such that locations with great information age are preferred as far as possible. The information age of the youngest grid point within the antenna lobe therefore determines the costs, which become higher the younger the youngest point is; (2) efficiency in terms of avoiding overlapping antenna lobes. Grid points that are picked up by multiple (combined) antenna lobes result in ever higher additional costs as the overlap increases; and (3) efficient in terms of attitude within the region of interest: for antenna lobes that point in the direction of the edge of the region, the costs become ever higher the more surface area outside the region of interest is picked up.

A position in the region of interest divided into a grid is found for each (combined) antenna group as the result of the optimization. The extent and shape of the antenna lobes divided into a grid are taken as a basis for setting the information age for all grid points picked up to zero and repeating the described method in the next time step.

Figure 5:
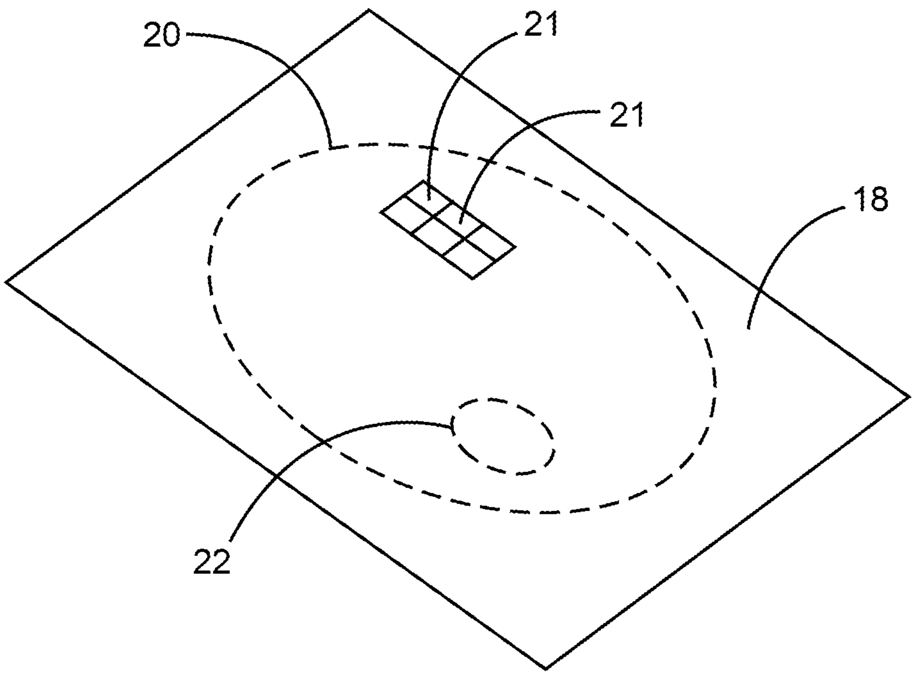
FIG. 5 shows a schematic representation of Earth's surface with two regions of interest.

FIG. 5 shows how this observation by grid points 21 may appear for the region 20 in the first mode of operation. In addition, the delimited region 22 can be observed in another mode of operation.

Multiple targets (or groups of targets) can be dynamically tracked with high temporal and spatial resolution in the second mode of operation, shown by way of illustration with reference to the region 22, which is distinctly smaller than the region 20.

The region of interest 22 is illuminated (i.e. radar signals are transmitted into the region of interest) by one or optionally by multiple transmitting satellites simultaneously (Tx-Multi-Beam On Target). In order to facilitate multilateration, reception is effected by as many satellites as are required in order to have a high probability of achieving successful detection in at least three bistatic transmission paths. A distinction is drawn between two states: "target(s) acquired" and "targets not acquired". At the beginning, the system monitors a predetermined coordinate ("capture range"), with which the antenna lobes of the assigned transmitters and receivers are continuously aligned for this purpose. The first target detected after the beginning of the task can be defined as a reference target in an automated manner. Alternatively, the selection can be influenced by a user. The results of the multilateration (position and speed) are taken as a basis for repositioning the antenna lobes at every instant, i.e. continually updating the directions, in such a way that the reference target remains in the center. The fluctuating target backscatter means that failures in the detection can arise in the meantime, of which the system is tolerant owing to the extent of the antenna lobe, i.e. despite movement the target remains within the antenna lobes for a certain time, even if the antenna lobes are not repositioned. In the event of a loss of detection, the system can hold the antenna lobes in the last position of successful detection. Alternatively, the system can take the last ascertained speed vector of the target as a basis for making a prediction about the expected current position of the target. Another possibility is for the system to determine the current position of the target on the basis of another mode of operation carried out in parallel. The selection of the respective strategy can be supported by the history of the previous detections (e.g. target acts in a highly agile manner, or is on a longer, steady approach).

Figure 6:
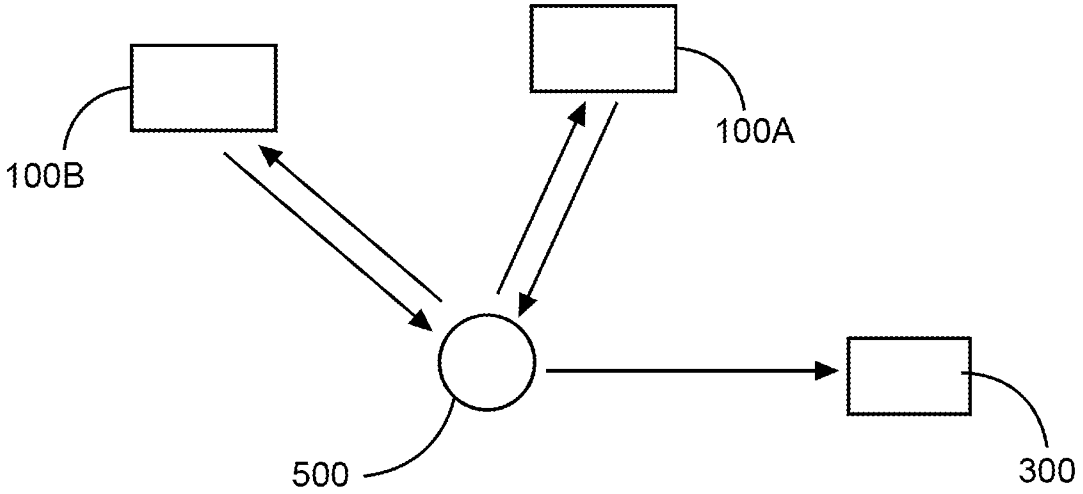
FIG. 6 shows a schematic representation of different modes of operation of a satellite-based observation system.

FIG. 6 shows a summarizing schematic representation of three modes of operation. In the first or second mode of operation, the satellite 100A transmits a signal in the direction of an object 500 to be observed. The reflected radar signals are received by the same satellite 100A or a second satellite 100B. In the first or second mode of operation, only satellite-based sensors are involved in the observation. The first and second modes of operation have been described by way of illustration with reference to FIGS. 3 to 5.

In the third mode of operation, which is described in more detail by way of illustration below, the signals reflected by the tracked object 500 are reflected to a receiver 300, which is a sensor signal receiver aboard an aircraft, for example. In this third mode of operation, the satellites 100A and 100B assist an observation process in which a region of interest is observed by receivers aboard aircraft (or by ground-based receivers).

The third mode of operation facilitates passive radar operation of the aircraft by illuminating a region of interest by the transmitting satellites 100A, 100B.

The transmitting satellites 100A, 100B are equipped with an antenna and instrumentation suitable for two frequency bands so that radar signals that can be received by systems aboard aircraft are transmitted in the third mode of operation. Alternatively, two types of transmitting satellites can be used. The third mode of operation is produced by switching one or more transmitting satellites to the radar frequency of the aircraft. There is normally not provision in the satellites for a reception option for the frequency used for the third mode of operation, since this would increase the complexity of the receiving satellites without significant added value.

The observed object 500 is detected and located in the aircraft 300 separately by way of information transmitted via a data link. If an adequate number of transmitters are used, position determination can take place in the individual aircraft by way of multilateration. Since the system has no satellite-based receivers in the reception band of the aircraft radars, if there is no other information available about the required alignment of the antenna lobes then other resources of the constellation can be used to also carry out the first or second mode of operation in parallel with the third mode of operation. The detections and locations obtained for reference targets can then be taken as a basis for continually updating the directions of the antenna lobes of the transmitters in the X-band mode.

Optionally, the aircraft 300 can be assisted further by sending the detections/locations additionally obtained by the satellite constellation to the aircraft via suitable data transmission paths for assistance.

Optionally, suitable communication paths (e.g. line-of-sight laser link) can be used to transfer control information, e.g. for controlling the antenna lobes, from the aircraft to the satellites 100A, 100B of the constellation.

The observation system described here is independent of aircraft-based or ground-based sensors (this applies in all modes of operation at the transmitter; it applies to the first and second modes of operation at the receiver). A region of interest is observed from a satellite orbit. By way of example, this can involve using a multi-static radar system, the frequency range of which can be adapted for the respective application. This also allows the visibility of aircraft camouflaged against radar reconnaissance to be increased, because such aircraft are typically and predominantly protected against monostatic detection from the ground or from the air.

It should additionally be pointed out that “comprising” or “having” does not exclude other elements or steps and “a(n)” or “one” does not exclude a plurality. Furthermore, it will be pointed out that features or steps that have been described with reference to one of the exemplary embodiments above can also be used in combination with other features or steps of other exemplary embodiments described above. Reference signs in the claims should not be regarded as a limitation.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms “comprise” or “comprising” do not exclude other elements or steps, the terms “a”, “an” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 Earth
12 horizon line
14 orbit
16 area on Earth’s surface or in the atmosphere
18 Earth’s surface
20 region of interest for extensive observation
21 grid point
22 region of interest for detailed observation
50 observation system
100 satellite, sensor carrier platform
105 control unit
110 data transmission interface (transmit, receive)
120 sensor signal emitter, antenna, electronically controlled
122 suspension
130 sensor signal receiver, antenna
132 suspension
140 propulsion unit
150 first area, accessible by controlling attitude
152 second area, accessible by adjusting the antennas
190 data transmission link
200 resource allocation unit
210 data transmission interface
300 receiver
500 observed object

The invention claimed is:

1. An observation system for observing a region of interest, comprising:

a plurality of mobile sensor carrier platforms, comprising:
- a first group of sensor carrier platforms that contains a sensor arrangement having a sensor signal emitter; and
- a second group of sensor carrier platforms that contains a sensor arrangement having a sensor signal receiver; and a resource allocation unit;

wherein the plurality of mobile sensor carrier platforms are configured for operation in at least one of three modes of operation at a predetermined instant, the three modes of operation comprising:

a first mode of operation, in which the region of interest is statically observed;

a second mode of operation, in which the region of interest is dynamically moved according to at least one observed object; and a third mode of operation, in which sensor signals are emitted into the region of interest and reflections of the sensor signals from the at least one observed object are received by at least one receiver that is spatially separate from the plurality of mobile sensor carrier platforms; and wherein the resource allocation unit is configured to:

assign at least one of the plurality of mobile sensor carrier platforms to a task linked to one of the three modes of operation, on a basis of one or more criteria of: relative position between the mobile sensor carrier platform and the region of interest, direction of movement of the mobile sensor carrier platform, direction of movement of the at least one observed object in the region of interest, a number of the mobile sensor carrier platforms with line of sight to the region of interest, attitude of the mobile sensor carrier platform, alignment of the sensor signal emitter and the sensor signal receiver, available resources of the mobile sensor carrier platform for observation tasks, and priority of the observation task;

ascertain a total number of the plurality of mobile sensor carrier platforms with a line of sight to the region of interest of the task;

given multiple tasks, to initially make an assignment according to availability and to assign one of the plurality of mobile sensor carrier platforms to a task that has a lowest number of the plurality of mobile sensor carrier platforms with line of sight to a relevant region of interest; and follow the assignment according to availability by making an assignment according to priority for the tasks, which involves initially assigning tasks with higher priority to the mobile sensor carrier platforms, wherein further tasks are assigned to the mobile sensor carrier platforms according to priority in descending order.

2. The observation system of claim 1, wherein the resource allocation unit is configured to reassign a task to one of the plurality of mobile sensor carrier platforms at regular or irregular intervals of time.

3. The observation system of claim 2, wherein the resource allocation unit is configured to reassign a task to the one of the plurality of mobile sensor carrier platforms when the resource allocation unit receives a further task.

4. The observation system of claim 1, wherein the resource allocation unit is configured to:

produce a command for adapting the attitude of one of the plurality of mobile sensor carrier platforms; and transmit the command to the one of the plurality of mobile sensor carrier platforms.

5. The observation system of claim 1, wherein the resource allocation unit is configured to:

produce a command for adapting the alignment of the sensor signal emitter and/or the sensor signal receiver; and transmit the command to one of the plurality of mobile sensor carrier platforms.

6. The observation system of claim 1, wherein the plurality of mobile sensor carrier platforms is a plurality of satellites in an Earth orbit.

7. The observation system of claim 6, wherein, in the first mode of operation and/or the second mode of operation, the region of interest is observed by:

a first sensor carrier platform of the plurality of mobile sensor carrier platforms emitting the sensor signals; and the first sensor carrier platform and/or at least one other sensor carrier platform of the plurality of mobile sensor carrier platforms receiving the reflections of the sensor signals from the at least one observed object.

8. The observation system of claim 6, wherein, in the first mode of operation and/or the second mode of operation, a mobile sensor carrier platform of the plurality of mobile sensor carrier platforms is configured to observe the region of interest on a basis of a timestamp of acquired observation data, with a result that the sensor signal emitter emits the sensor signals, in a form of radar signals, into an area whose acquired observation data has an oldest timestamp, the area being in the region of interest.

9. The observation system of claim 6, wherein, in the third mode of operation, the region of interest is observed by one of the plurality of mobile sensor carrier platforms emitting the sensor signal and, using the sensor signal receiver, which is aboard an aircraft that is in flight, receiving the reflections of the sensor signals from the at least one observed object.

10. The observation system of claim 1, wherein:

the resource allocation unit is arranged spatially separately from the plurality of mobile sensor carrier platforms; or the resource allocation unit is structurally associated with at least one of the mobile sensor carrier platforms.

11. A method of using an observation system for observing a region of interest, the method comprising:

providing a plurality of mobile sensor carrier platforms, comprising:

a first group of sensor carrier platforms that contains a sensor arrangement having a sensor signal emitter; and a second group of sensor carrier platforms that contains a sensor arrangement having a sensor signal receiver;

providing a resource allocation unit;

operating the plurality of mobile sensor carrier platforms in at least one of three operating modes, the three operating modes comprising:

a first mode of operation, comprising statically observing the region of interest;

a second mode of operation, comprising dynamically moving the region of interest, according to at least one observed object; and a third mode of operation, comprising emitting sensor signals into the region of interest and receiving, by at least one receiver that is spatially separate from the plurality of mobile sensor carrier platforms, reflections of the sensor signals from the at least one observed object;

assigning, using the resource allocation unit, at least one of the mobile sensor carrier platforms to a task linked to one of the three modes of operation, on a basis of one or more criteria of: relative position between the mobile sensor carrier platform and the region of interest, direction of movement of the mobile sensor carrier platform, direction of movement of the at least one observed object in the region of interest, a number of the mobile sensor carrier platforms with line of sight to the region of interest, attitude of the mobile sensor carrier platform, alignment of the sensor signal emitter and the sensor signal receiver, available resources of the mobile sensor carrier platform for observation tasks, and priority of the observation task;

ascertaining, using the resource allocation unit, a total number of the plurality of mobile sensor carrier platforms with a line of sight to the region of interest of the task;

given multiple tasks, using the resource allocation unit to initially make an assignment according to availability and to assign one of the plurality of mobile sensor carrier platforms to a task that has a lowest number of the plurality of mobile sensor carrier platforms with line of sight to a relevant region of interest; and following, using the resource allocation unit, the assignment according to availability by making an assignment according to priority for the tasks, which involves initially assigning tasks with higher priority to the mobile sensor carrier platforms, wherein further tasks are assigned to the mobile sensor carrier platforms according to priority in descending order.

12. The method of claim 11, comprising reassigning, using the resource allocation unit, a task to one of the plurality of mobile sensor carrier platforms at regular or irregular intervals of time.

13. The method of claim 12, comprising reassigning, using the resource allocation unit, a task to the one of the plurality of mobile sensor carrier platforms when the resource allocation unit receives a further task.

14. The method of claim 11, comprising using the resource allocation unit for:

producing a command for adapting the attitude of one of the plurality of mobile sensor carrier platforms; and transmitting the command to the one of the plurality of mobile sensor carrier platforms.

15. The method of claim 11, comprising using the resource allocation unit for:

producing a command for adapting the alignment of the sensor signal emitter and/or the sensor signal receiver; and transmitting the command to one of the plurality of mobile sensor carrier platforms.

16. The method of claim 11, wherein the plurality of mobile sensor carrier platforms is a plurality of satellites in an Earth orbit.

17. The method of claim 16, wherein the region of interest is observed in the first mode of operation and/or the second mode of operation by:

a first sensor carrier platform of the plurality of mobile sensor carrier platforms emitting the sensor signals; and the first sensor carrier platform and/or at least one other sensor carrier platform of the plurality of mobile sensor carrier platforms receiving the reflections of the sensor signals from the at least one observed object.

18. The method of claim 16, wherein, in the first mode of operation and/or the second mode of operation, a mobile sensor carrier platform of the plurality of mobile sensor carrier platforms observes the region of interest on a basis of a timestamp of acquired observation data, with a result that the sensor signal emitter emits the sensor signals, in a form of radar signals, into an area whose acquired observation data has an oldest timestamp, the area being in the region of interest.

19. The method of claim 16, comprising, in the third mode of operation, observing the region of interest by one of the plurality of mobile sensor carrier platforms emitting the sensor signals and, using the sensor signal receiver, which is aboard an aircraft that is in flight, receiving the reflections of the sensor signals from the at least one observed object.

20. The method of claim 11, wherein:

the resource allocation unit is arranged spatially separately from the plurality of mobile sensor carrier platforms; or the resource allocation unit is structurally associated with at least one of the mobile sensor carrier platforms.

* * * * *